US008806300B2

(12) United States Patent
Kitahara et al.

(10) Patent No.: US 8,806,300 B2
(45) Date of Patent: Aug. 12, 2014

(54) STORAGE SUBSYSTEM

(75) Inventors: Jun Kitahara, Yokohama (JP);
Masanori Takada, Yokohama (JP);
Sadahiro Sugimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 379 days.

(21) Appl. No.: 12/526,666

(22) PCT Filed: May 25, 2009

(86) PCT No.: PCT/JP2009/059921
§ 371 (c)(1),
(2), (4) Date: Aug. 11, 2009

(87) PCT Pub. No.: WO2010/137178
PCT Pub. Date: Dec. 2, 2010

(65) Prior Publication Data
US 2011/0238885 A1 Sep. 29, 2011

(51) Int. Cl.
*G11C 29/00* (2006.01)

(52) U.S. Cl.
USPC ............................................ 714/770; 714/763

(58) Field of Classification Search
CPC ...................... G06F 2212/262; G06F 11/1076
USPC .................................................. 714/770, 763
See application file for complete search history.

(56) References Cited

U.S. PATENT DOCUMENTS

| 5,191,584 | A | | 3/1993 | Anderson |
| 5,594,862 | A | * | 1/1997 | Winkler et al. .............. 714/5.11 |
| 5,734,812 | A | | 3/1998 | Yamamoto et al. |
| 5,765,183 | A | | 6/1998 | Kojima et al. |
| 5,787,460 | A | | 7/1998 | Yashiro et al. |
| 5,799,140 | A | | 8/1998 | Niijima et al. |
| 5,920,502 | A | * | 7/1999 | Noda et al. ............... 365/185.09 |
| 5,954,822 | A | * | 9/1999 | Yashiro et al. ............... 714/6.12 |
| 6,002,612 | A | * | 12/1999 | Noda et al. ............... 365/185.09 |
| 7,035,974 | B2 | * | 4/2006 | Shang ........................... 711/114 |
| 2002/0007469 | A1 | * | 1/2002 | Taketa et al. ...................... 714/6 |
| 2002/0194428 | A1 | | 12/2002 | Green |
| 2007/0186040 | A1 | | 8/2007 | Kasahara et al. |
| 2008/0201392 | A1 | | 8/2008 | Nakajima et al. |

FOREIGN PATENT DOCUMENTS

| JP | 10-260792 A | 9/1998 |
| JP | 6-119126 A | 6/1999 |
| JP | 2008-204041 A | 9/2008 |
| WO | 2005/076203 A1 | 8/2005 |

OTHER PUBLICATIONS

IBM Corp., Use of Non-Volatile Semiconductor Storage for Disk Array Parity, IBM Technical Disclosure Bulletin, Nov. 1990, p. 254, vol. 33, No. 6B, Armonk, NY, USA.

* cited by examiner

*Primary Examiner* — M. Mujtaba K Chaudry
(74) *Attorney, Agent, or Firm* — Mattingly & Malur, PC

(57) ABSTRACT

The storage system includes a plurality of flash memory devices, each of the flash memory devices including a flash memory controller and flash memory chips, which are configured as a RAID group and a storage controller, coupled to the plurality of flash memory devices, configured to receive data from a computer and send the data to a first flash memory device of the plurality of flash memory devices. The flash memory controller of the flash memory device is configured to receive the data from the storage controller and execute a parity operation using the data.

10 Claims, 15 Drawing Sheets

STORAGE SUBSYSTEM

TECHNICAL FIELD

The present invention relates to a storage subsystem mounted with nonvolatile semiconductor memory such as flash memory in a storage apparatus.

BACKGROUND ART

In recent years, attention has focused on the flash memory, a typical nonvolatile semiconductor memory, for storage devices. Because a flash memory does not have a drive portion like a magnetic storage device typified by a HDD (Hard Disk Drive), it features lower power consumption than a HDD. A storage device that uses a memory drive mounted with a plurality of flash memories instead of a HDD has been proposed as an external storage device (refer to Patent Document 1).

Meanwhile, a storage subsystem must be stable, and as such, employs a configuration with duplexed components that enables processing to be carried out even when a malfunction occurs in a portion of the components. For example, in order to heighten data integrity and throughput, RAID (Redundant Array of Inexpensive Disks) technology is used to manage a plurality of storage devices as a single RAID Group, and to redundantly store data. The RAID Group forms one or more logical storage areas at this time. When data is stored in the storage area, redundant data is stored in the storage devices configuring the RAID Group. Storing redundant data in the storage devices makes it possible to recover the data even when one of the storage devices malfunctions.

For example, in a case where a memory drive comprising flash memories is configured as RAID 5, a ECC (Error Correct Code) computed using a plurality of data is stored in an ECC memory drive, and even if one memory drive should malfunction, it is possible to recover the data stored in the failed memory drive by using the remaining data and the ECC.

However, if malfunctions should occur in more than a predetermined number of memory drives, it becomes impossible to recover the data even in a RAID-configured subsystem. Accordingly, a storage subsystem generally makes use of an extra drive in which data has not been stored, called a spare drive.

The storage subsystem employs a configuration in which, in a case where a malfunction occurs in one of the RAID-configured memory drives, the data in the failed memory drive is recovered using the data in the remainder of the RAID-configured memory drives, and is stored in the spare drive.

Patent Document 1

Japanese Patent Application Laid-open No. 2008-204041

In a RAID 5-configured storage subsystem, for example, when data a, b, c is written to a storage device during an initial data write, the data a, b, c is respectively stored in three HDD or memory drives, a parity is created by using the data a, b, c to carry out an exclusive OR operation, and the created parity is stored in either a HDD or memory drive designated for storing the parity.

The configuration is such that a processor for controlling the input/output of data to/from the storage devices at this time creates the parity by using the data a, b, c in a cache memory to carry out the exclusive OR operation, and stores the created parity in either the parity-storage-designated HDD or memory drive.

During a random write in line with a data update, the processor uses an exclusive OR operation to create a new parity based on the old data, which has been targeted for updating, new data and the old parity (the parity corresponding to the old data), and stores the created new parity in either the HDD or memory drive designated for parity storage.

However, when updating HDD data, the HDD data may be overwritten. For this reason, there is the possibility of the old parity stored in the HDD being lost as a result of the overwrite process. When this happens, it is not possible to use the old parity to create a new parity when updating HDD data.

By contrast, when updating flash memory data, new data is written to the update region as new data, and the old data targeted for updating remains until the entire block is deleted. For this reason, the new parity stored in the memory drive also remains as-is until the block is deleted in its entirety. In this case, it is possible to use the old parity to create the new parity when updating flash memory data.

However, in a configuration in which the processor uses cache memory to carry out an operation for creating the new parity, the processor accesses the cache memory many times, making it impossible to reduce the load on the processor.

DISCLOSURE OF THE INVENTION

An object of the present invention is to provide a storage subsystem that makes it possible to carry out the processing accompanying a data update by distributing this processing between a control unit that controls a cache memory and a memory controller that controls a nonvolatile semiconductor memory.

To achieve the above-mentioned object, the present invention is characterized in that, when updating data in a nonvolatile semiconductor memory, the present invention creates a command for data updating in the control unit that controls the cache memory, transfers the created command from the control unit to the memory controller that controls the nonvolatile semiconductor memory, creates a new parity by carrying out an exclusive OR operation in the memory controller on the basis of this command, and stores the created new parity in the nonvolatile semiconductor memory provided for storing parity.

According to the present invention, when updating data in a nonvolatile semiconductor memory, it is possible to lessen the load on the control unit that controls the cache memory.

EXPLANATION OF REFERENCE NUMERALS

10 UPPER HOST SYSTEM
12 STORAGE SUBSYSTEM
14 NETWORK
16 UPPER HOST SYSTEM INTERFACE UNIT
18 MAIN PROCESSOR
20 SWITCH
22 CACHE
24 DISK DRIVE CONTROL UNIT
26 STORAGE APPARATUS
38 HDD
40 FLASH MODULE
42 FLASH MEMORY CONTROLLER
44 FLASH MEMORY
48 MICROPROCESSOR
50 RAM
52 ROM
64 FLASH MEMORY CHIP
70 BLOCK
72 PAGE
74 USER AREA
76 RENEWAL AREA

BEST MODE FOR CARRYING OUT THE INVENTION

Embodiment 1

This embodiment is configured such that during a random write, the main processor, which controls the cache, creates an XOR write command at the time the update data is written to the flash module, and transfers the created XOR write command to the flash memory controller that controls the flash memory, the flash memory controller parses the XOR write command, reads out the old parity from the parity-storage flash memory, creates a new parity by carrying out an exclusive OR operation using the read-out old parity and the old data and new data added to the XOR write command, and stores the created new parity in the parity-storage flash memory.

Figure 1:
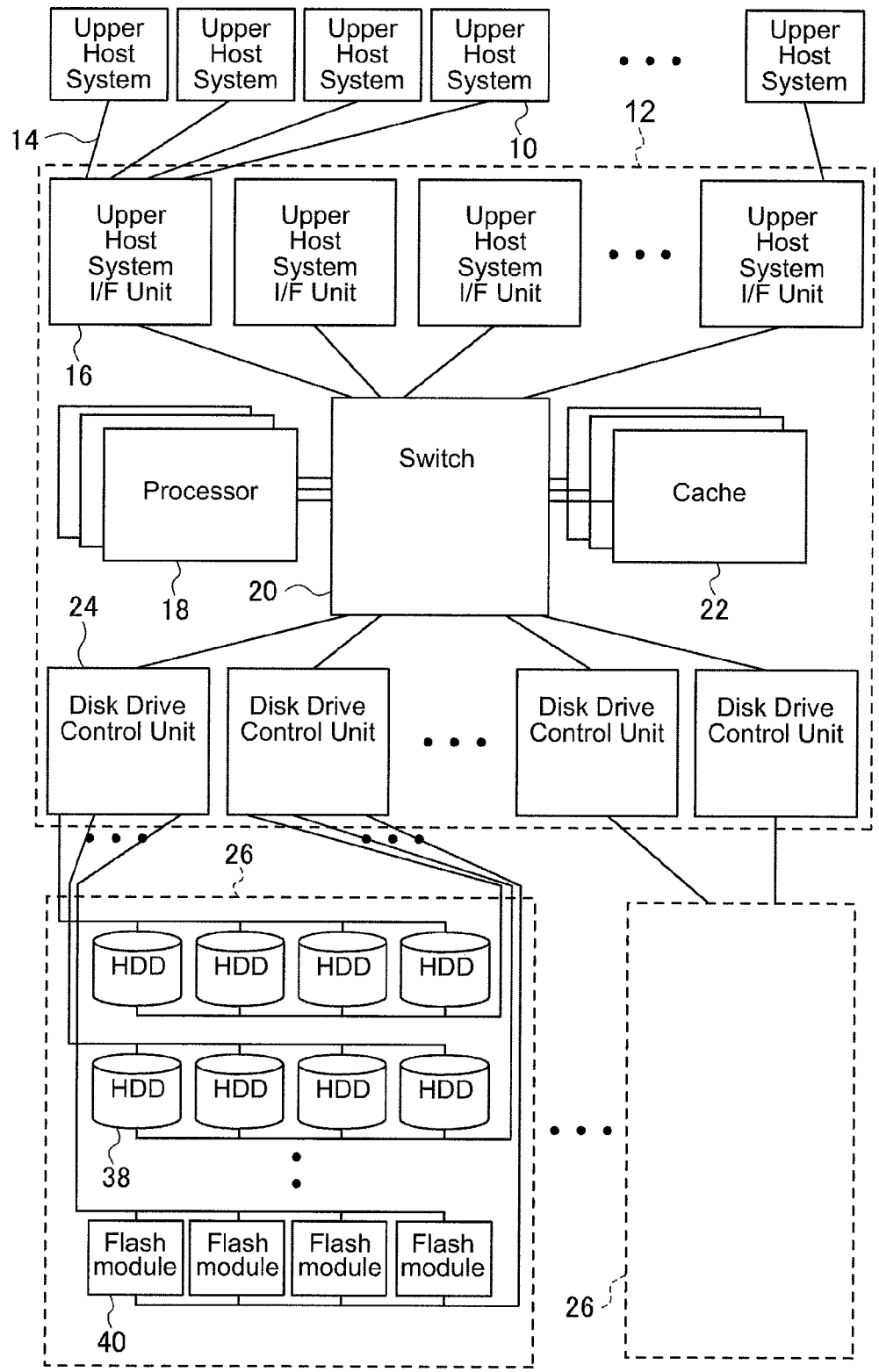
FIG. 1 is a block diagram of a storage system showing a first embodiment of the present invention.

The first embodiment of the present invention will be explained below based on the drawings. FIG. 1 is a block diagram of a storage system showing the first embodiment of the present invention.

In FIG. 1, the storage system comprises a plurality of upper host systems 10 and a storage subsystem 12, and each upper host system 10 is connected to the storage subsystem 12 via a network 14.

For example, a SAN (Storage Area Network), LAN (Local Area Network), the Internet, a leased line, a public telephone network, or any data communication-enabled network may be used as the network 14. Also, the fibre channel protocol, or the TCP/IP protocol may be used as the protocol for the network 14, and even an arbitrary protocol may be used as long as the protocol enables the exchange of data between the upper host systems 10 and the storage subsystem 12.

The upper host system 10 comprises a host computer (not shown in the drawing). The host computer, for example, comprises a CPU (Central Processing Unit), a memory, an input device, an output device, and a host adapter. The CPU creates a read request (read command) and a write request (write command) in accordance with an application program stored in the memory, and sends same from the host adapter. A LUN (Logical Unit Number) and a LBA (Logical Block Address), via which read-targeted data is managed, are included in a read request sent from the upper host system 10 at this time. Further, for example, a LUN and a LBA, to which write-targeted data is written, and write-targeted data are included in a write request sent from the upper host system 10.

The storage subsystem 12 comprises a plurality of upper host system interface units 16; a plurality of main processors 18; a switch 20; a plurality of cache memories (referred to as cache hereinafter) 22; a plurality of disk drive control units 24; and a plurality of storage apparatuses 26, and a logical volume constructed in accordance with the respective storage apparatuses 26 may be provided to the respective upper host systems 10 via the network 14.

Each upper host system interface unit 16 is connected to the switch 20 by way of an internal network 28, each main processor 18 is connected to the switch 20 by way of an internal network 30, and each cache 22 is connected to the switch 20 by way of an internal network 32. The switch 20 is connected to the respective disk drive control units 24 by way of an internal network 34, and the respective disk drive control units 24 are connected to the respective storage apparatuses 26 by way of an internal network 36.

Each upper host system interface unit 16 is configured as a first interface unit for exchanging information with the respective upper host systems 10 via the network 14, and carrying out data input/output processing for the respective upper host systems 10.

Each main processor 18, as a control unit for controlling the storage apparatuses 26 and the caches 22, executes a variety of operations in accordance with commands from a program or the respective upper host systems 10, and, for example, the processes accompanying a control operation or random write for controlling the caches 22 and the storage apparatuses 26. At this time, the respective main processors 18 temporarily store the data associated with processing in the cache 22, and execute data input-output processing using the cache 22-stored data.

Each disk drive control unit 24 is configured as a second interface unit for exchanging information with the respective main processors 18 via the switch 20, exchanging information with the respective storage apparatuses 26 via an internal network 36, and carrying out data input/output processing with respect to the groups of storage devices inside the storage apparatuses 26.

The storage apparatus 26 comprises a plurality of HDD 38 and also comprises a plurality of flash modules 40, and the plurality of HDD 38 is configured as a disk array and the plurality of flash modules 40 is configured as a flash module array.

At this time, either a logical device (VDEV: Virtual Device) or a logical volume, which is a logical storage device capable of being referenced from the upper host system 10, may be allocated to a storage area of either the respective HDD 38 or the respective flash modules 40. In accordance with this, in a case where a RAID (Redundant Array of Inexpensive Disks) Group is configured by the plurality of HDD 38 or the plurality of flash modules 40, the RAID Group storage area may also be utilized as either the logical device or the logical volume storage area.

Figure 2:
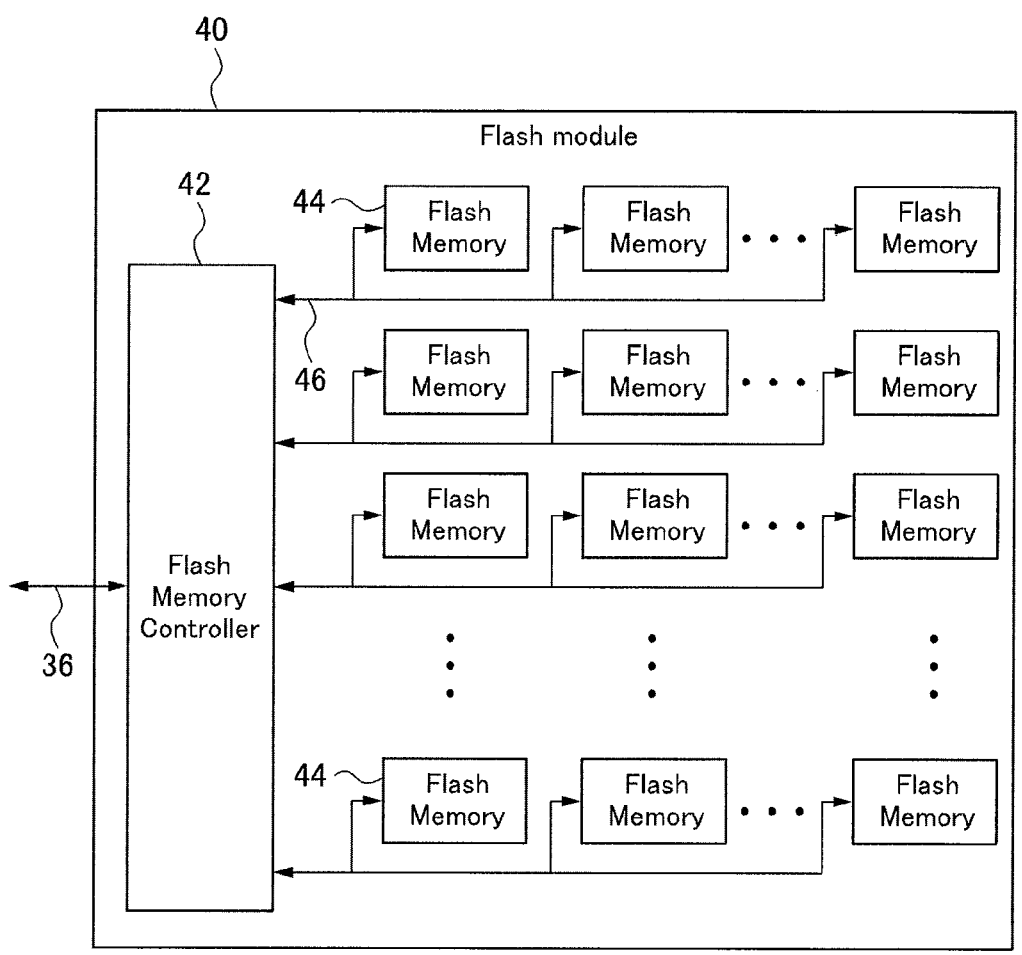
FIG. 2 is a block diagram of a flash module.

Each flash module 40, as shown in FIG. 2, comprises a flash memory controller 42 and a plurality of flash memories 44. Each flash memory 44 is connected to the flash memory controller 42 via a bus 46, and the flash memory controller 42 is connected to the disk drive control unit 24 via the internal network 36.

Figure 3:
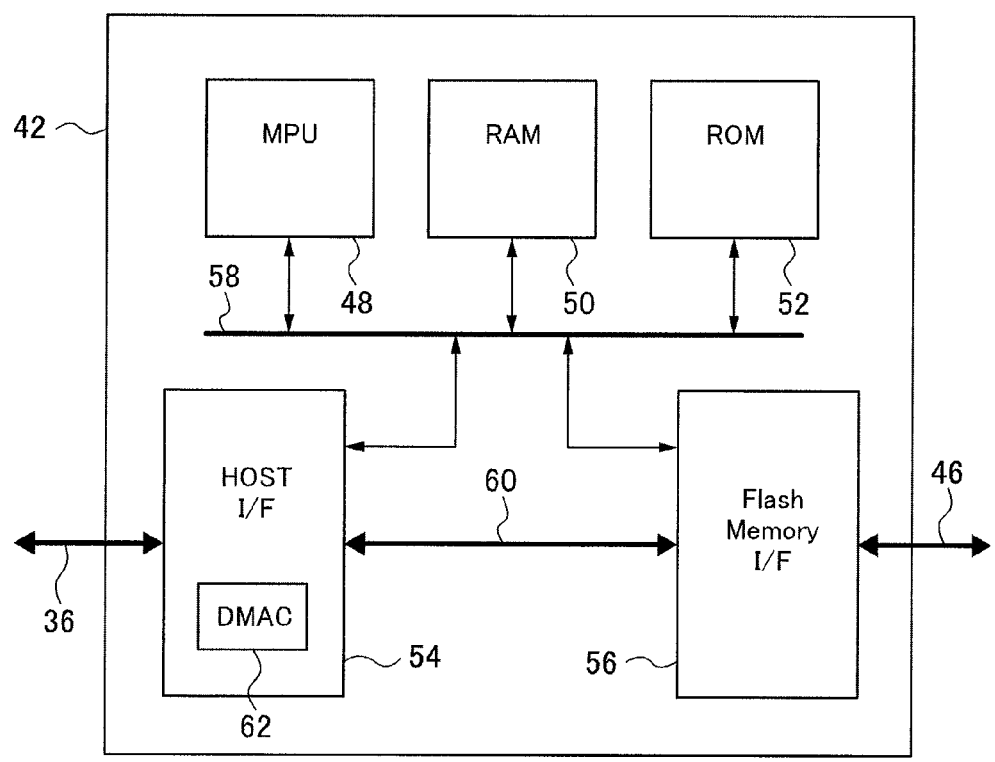
FIG. 3 is a block diagram of a flash memory controller.

The flash memory controller 42, as shown in FIG. 3, comprises a microprocessor (MPU: Microprocessing Unit) 48; a RAM (Random Access Memory) 50; a ROM (Read Only Memory) 52; a host interface 54; and a flash memory interface 56. The microprocessor 48, RAM 50 and ROM 52 are respectively connected to a bus 58, and the host interface 54 and flash memory interface 56 are connected to a bus 60. The host interface 54 is connected to the disk drive control unit 24 via the internal network 36, and is also connected to the microprocessor 48, RAM 50 and ROM 52 via the bus 58. The host interface 54 is connected to the flash memory interface 56 via the bus 60, and the flash memory interface 56 is connected to the respective flash memories 44 via the bus 46.

The host interface 54, under the control of the microprocessor 48, executes data input/output processing to/from the disk drive control unit 24 via the internal network 36. The flash memory interface 56, under the control of the microprocessor 48, executes data input/output processing to/from the respective flash memories 44 via the bus 46. At this time, a direct memory access controller (DMAC) 62, which is built into the host interface 54, executes external data input/output processing to/from the flash memories 44 without relying on the control of the microprocessor 48.

The microprocessor 48, as an auxiliary processor, executes various types of operational processing in accordance with a program stored in the ROM 52, parses a command inputted from the host interface 54, stores the results of parsing in the RAM 50, and also executes an operational process in accordance with the parsing result, and controls the input/output processing of data to/from the respective flash memories 44 by way of the flash memory interface 56.

Figure 4:
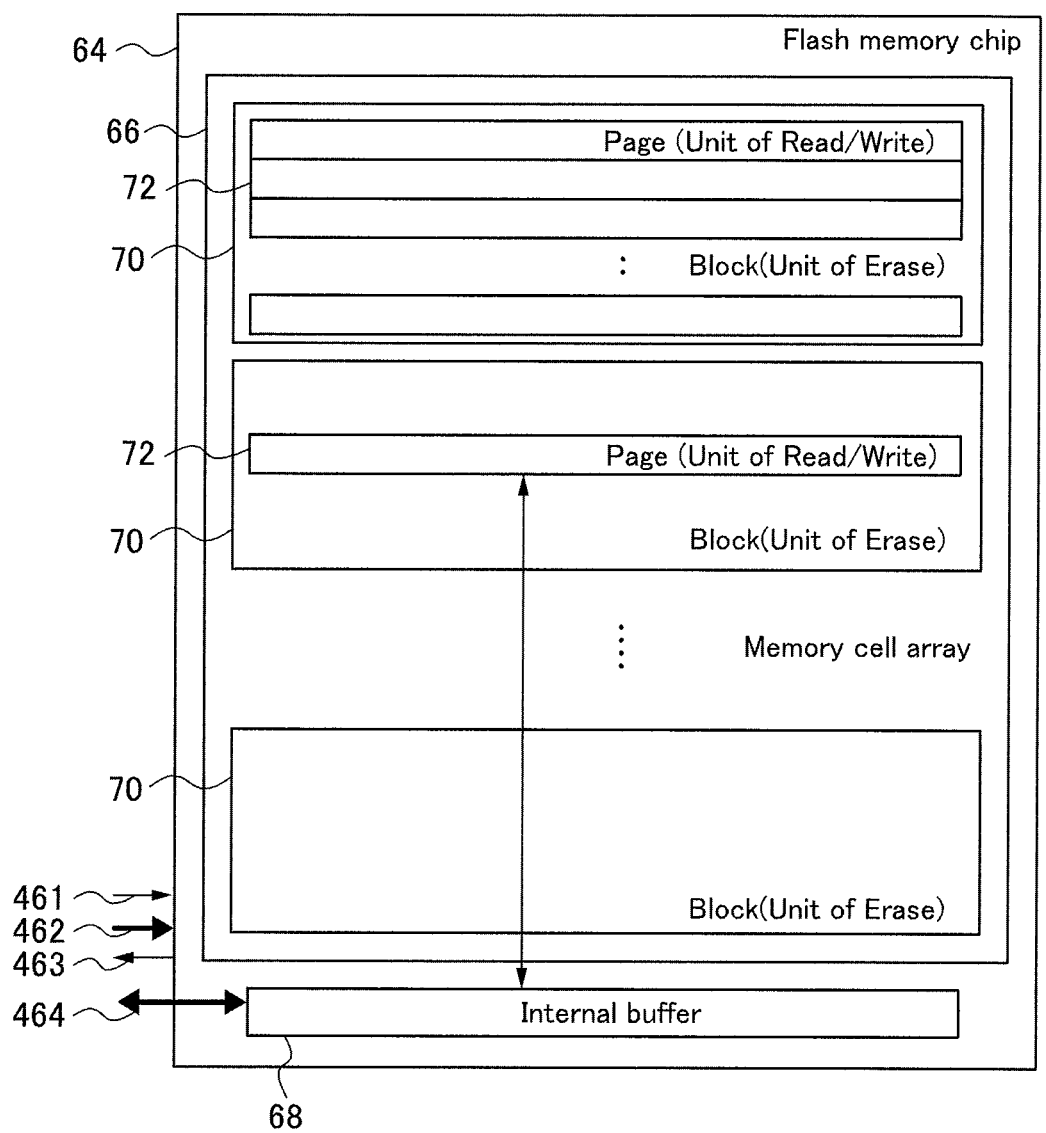
FIG. 4 is a block diagram of a flash memory.

As shown in FIG. 4, each flash memory 44 comprises a flash memory chip 64, and a memory cell array 66 and internal buffer 68 are formed in the flash memory chip 64. Between several thousands and several hundreds of thousands of blocks 70, which constitute data erase units, are formed in the memory cell array 66, and a plurality of pages 72, which constitute either data read or data write units, is formed in each block 70.

A chip select line 461, a control line 462, and a ready/busy line 463 are connected to this flash memory chip 64 as signal lines belonging to the bus 46. In addition, an 8-bit I/O line 464 is connected to the internal buffer 68 as a signal line belonging to the bus 46.

Figure 5:
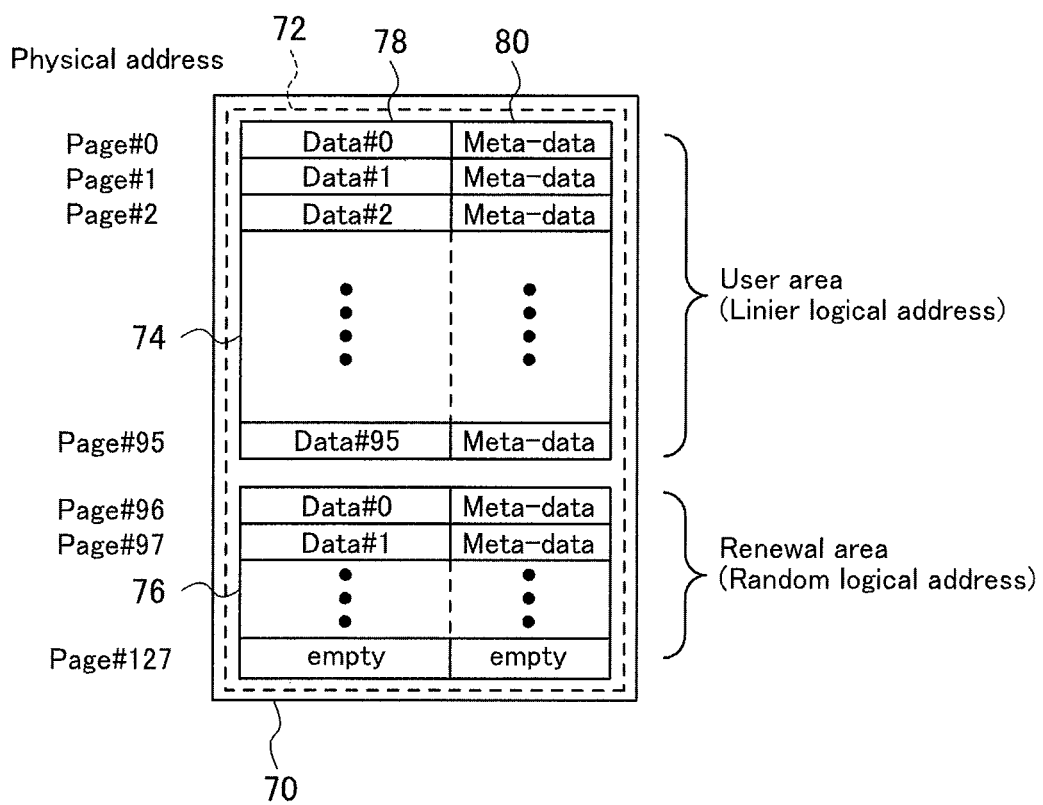
FIG. 5 is a diagram of a block of a memory cell array.

Each block 70, as shown in FIG. 5, comprises a user area 74; and a renewal area 76. The user area 74 is divided into pages 72 numbered from #0 through #95, and the renewal area 76 is divided into pages 72 numbered from #96 through #127. The physical address of the respective pages 72 #0 through #127 are set to #0 through #127.

Data 78 numbered #0 through #95 is stored in pages 72 numbered #0 through #95, and metadata 80 is also stored in each of these pages 72 as management information for managing the respective data 78.

Conversely, the renewal area 76 is a storage area for storing data at update time. For this reason, pages 72 numbered #96 through #127 of the renewal area 76 are empty prior to data updating.

Figure 6:
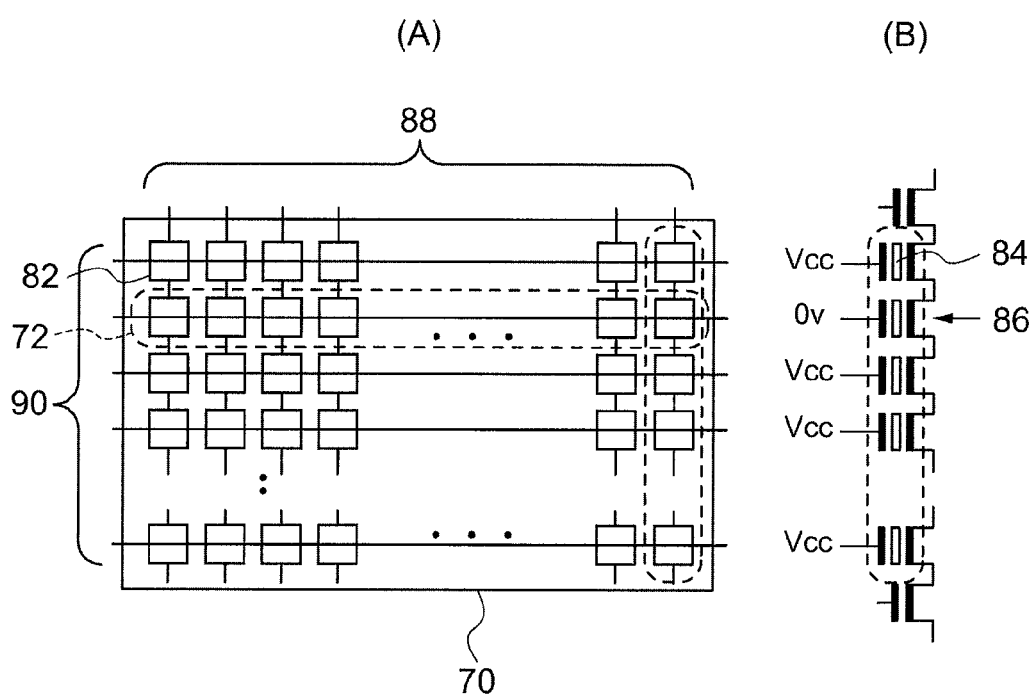
FIG. 6 (A) is a circuit diagram of a memory cell, and FIG. 6 (B) is a circuit diagram illustrating the cell structure of the memory cell.

As shown in FIGS. 6 (A) and (B), each block 70 comprises a plurality of memory cells 82, and the respective memory cells 82 are arrayed in a lattice-like pattern. A page 72 is comprised of one horizontal row of these memory cells 82. Each memory cell 82 is configured as a field-effect transistor 86 having a floating gate 84. A bit line 88 and a word line 90 are connected to each memory cell 82. The respective bit lines 88 and respective word lines 90 are arranged orthogonally to one another.

Figure 7:
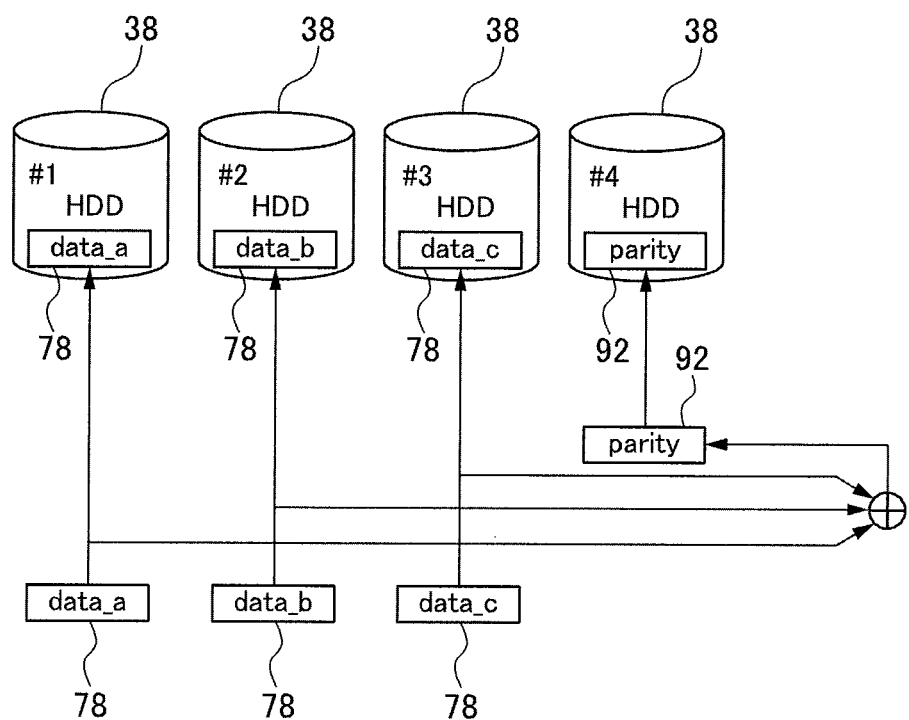
FIG. 7 is a diagram illustrating a sequential write process.

In the above-mentioned configuration, a given main processor 18 parses a command from the upper host system 10, and based on this parsing result, carries out processing for converting the logical address added to the command to a physical address in accordance with a conversion table, and, in addition, carries out input/output processing to/from the storage apparatus 26. As shown in FIG. 7, for example, when writing in "a", "b" and "c" data 78 during a sequential write, which is when the data is initially written in, processing is carried out for writing the "a" data 78 to the #1 HDD 38, the "b" data 78 to the #2 HDD 38, and the "c" data 78 to the #3 HDD 38, respectively. In addition, the main processor 18 executes processing for creating a parity 92 based on the "a" through "c" data 78, and for writing the parity 92 to the #4 HDD 38.

That is, the main processor 18 carries out an operation for creating a parity 92, and, in addition, transfers the created parity 92 to the disk drive control unit 24 together with the "a", "b" and "c" data 78, and provides to the disk drive control unit 24 instructions to store the "a", "b" and "c" data 78 and the parity 92 in specified HDD 38.

In accordance with this, when respectively distributing and storing the "a", "b" and "c" data 78 and the parity 92 in the flash modules 40, the main processor 18 also carries out an operation for creating a parity 92, and thereafter furnishes an instruction to the flash memory controller 42 via the disk drive control unit 24 to respectively distribute and store the "a", "b" and "c" data 78 and the parity 92 in the #1 through #4 flash modules 40.

Figure 8:
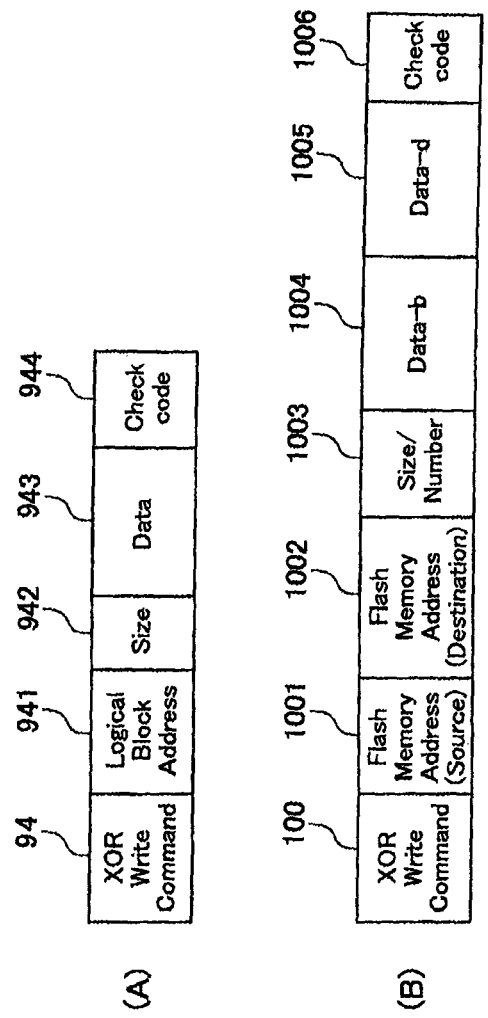
FIG. 8 (A) is a diagram of an XOR write command for an HDD, and FIG. 8 (B) is a diagram of an XOR write command for a flash memory.

Conversely, during a random write, the main processor 18 executes an XOR write in accordance with an XOR write command 94 as shown in FIG. 8 (A). The XOR write command 94 is configured from a logical block address (LBA) 941, a size 942, data 943, and a check code 944.

Figure 9:
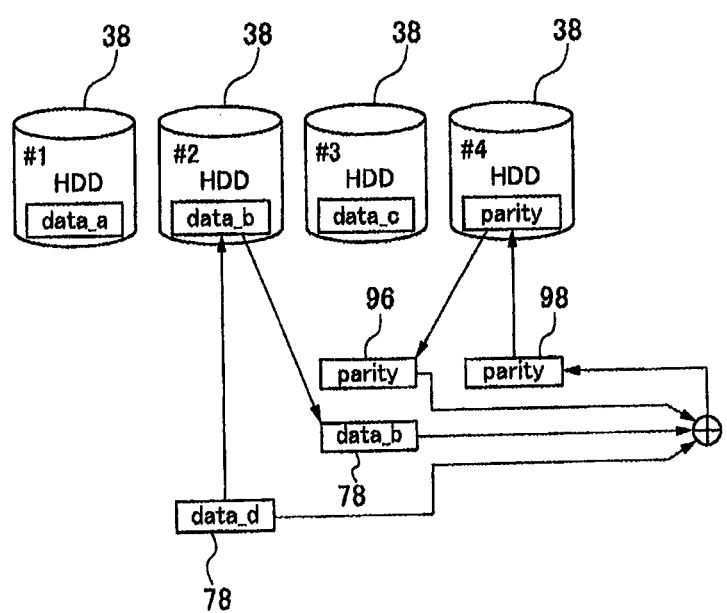
FIG. 9 is a diagram illustrating the operation during a random write to an HDD.

When updating data during a random write, for example, when the "b" data 78 is regarded as the old data, the "d" data 78 is regarded as the new data, and the old data is updated to the new data as shown in FIG. 9, the main processor 18 executes an XOR (Exclusive OR) write operation for retrieving the parity 92 from the #4 HDD 38 as the old parity 96, retrieving the "b" data 78 from the #2 HDD 38 as the old data, creating a new parity 98 by carrying out an exclusive OR operation based on the "b" data 78, the "d" data 78 and the old parity 96, and writing the new parity 98 to the #4 HDD 38.

Conversely, when writing update data to the flash module 40 during a random write, the main processor 18 does not carry out an operation for creating a new parity 98, but rather, as shown in FIG. 8 (B), creates an XOR write command 100, and transfers the created XOR write command 100 to the flash memory controller 42 via the disk drive control unit 24.

The XOR write command 100 at this time is configured from flash memory address 1001, which constitutes the physical address of the old parity 96, flash memory address 1002, which constitutes the physical address of the new parity 98, size/number 1003, data 1004, data 1005, and a check code 1006.

Figure 10:
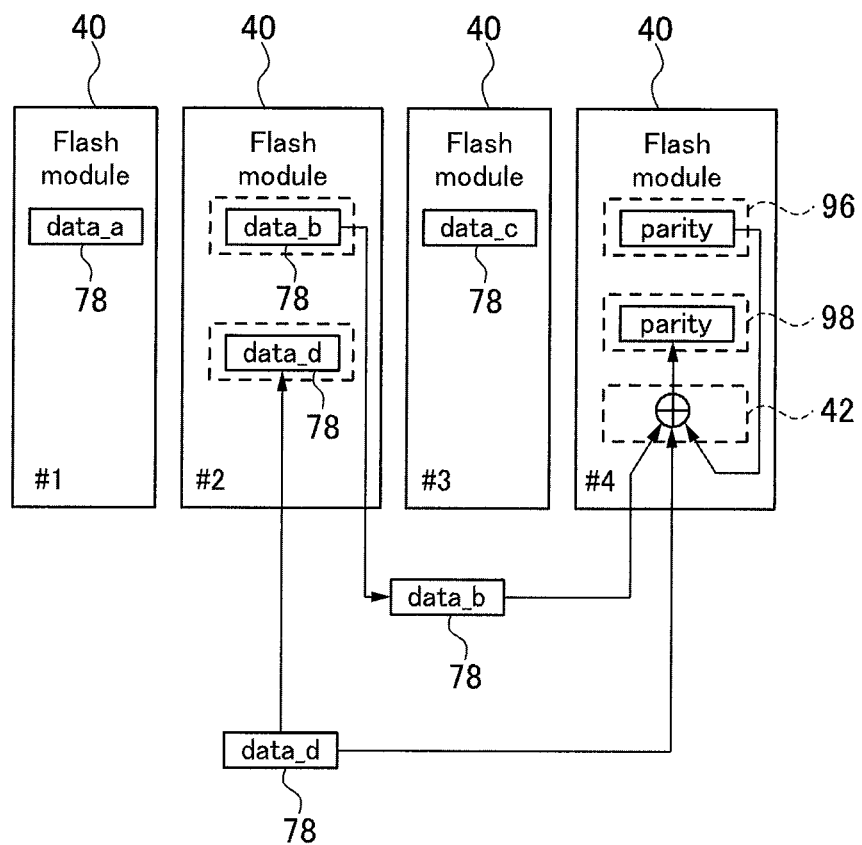
FIG. 10 is a diagram illustrating the operation during a random write to a flash memory.

In a case where the flash memory controller 42 updates the "b" data 78 stored in the #2 flash module 40 as the old data, and the "d" data 78 as the new data as shown in FIG. 10, the flash memory controller 42 reads out the old parity 96 stored in the #4 flash module (parity storage flash module) 40, carries out an exclusive OR operation using the read-out old parity 96, the "b" data 78, and the "d" data 78 to create a new parity 98, and executes an XOR write process for the created new parity 98 to a page of the renewal area 76 of FIG. 5, for example, the #96 page 72.

That is, barring an erase operation having been carried out for the block 70 where the old parity 96 exists, the old parity 96 exists in the #4 flash module 40, and the flash memory controller 42 uses the old parity 96 to carry out an exclusive OR operation to generate the new parity 98.

In this case, the main processor 18 may simply create the XOR write commend 100 and transfer the created XOR write command 100 to the flash memory controller 42 by way of the disk drive control unit 24 without having to use the cache 22 to carry out a parity creation operation, making it possible to lessen the processing (load) at the time of a random write to the flash module 40.

Further, within the XOR write command 100, the physical address of the old parity 96 is stored in flash memory address 1001, the physical address of the new parity 98 is stored in flash memory address 1002, the "b" data 78, which is the old data, is stored in data 104, and the "d" data 78, which is the new data, is stored in data 1005.

Figure 11:
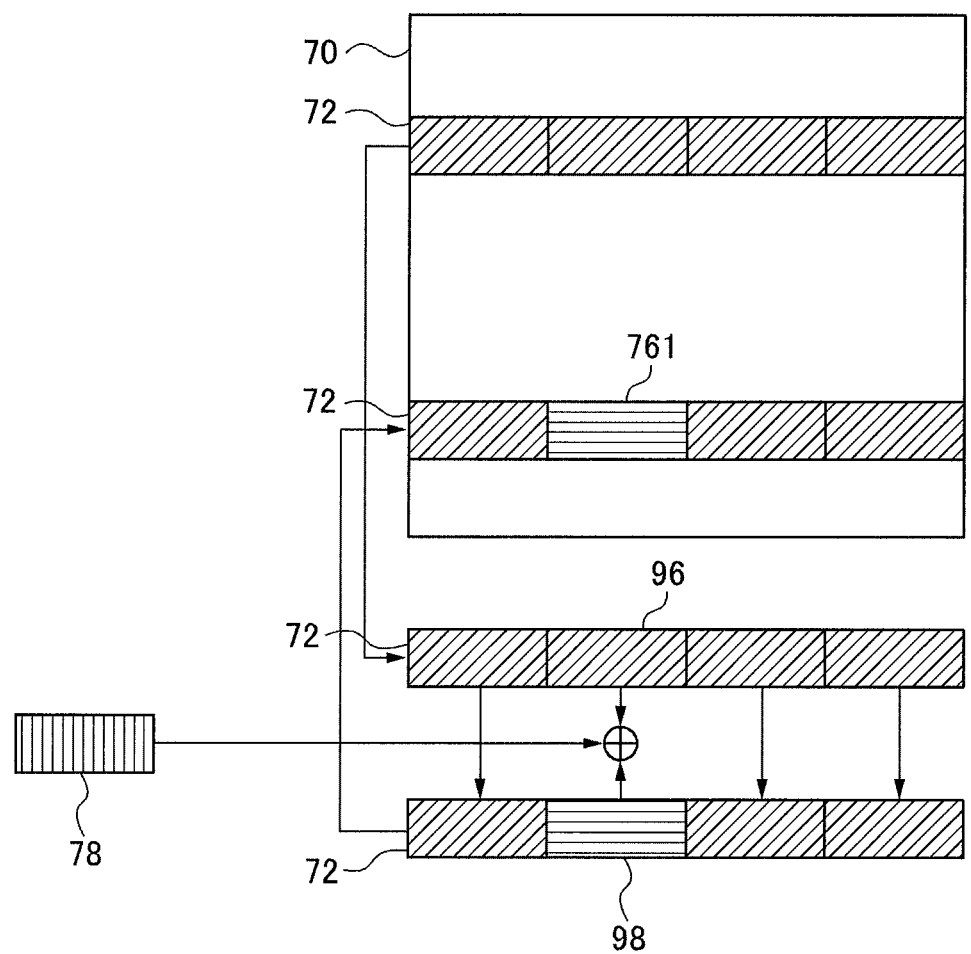
FIG. 11 is a diagram illustrating a method for storing parity in a renewal area of one sector's worth of a page.

The microprocessor 48 of the flash memory controller 42 parses the XOR write command 100, and, as shown in FIG. 11, reads out the old parity 96 from the page 72 of the user area 74 of the flash memory 44 that belongs to the #4 flash module 40 in accordance with the physical address that has been added to the flash memory address 1001, creates a new parity 98 by carrying out an exclusive OR operation using the read-out old parity 96, the "b" data 78, which is the old data that has been added to data 1004, and the "d" data 78, which is the new data that has been added to data 1005, and stores the created new parity 98 in a micro-area 761 of the specified page 72 from among the #96 through #127 pages 72 belonging to the renewal area 76 in accordance with the physical address that has been added to the flash memory address 1002.

As described hereinabove, when writing update data to a flash module 40 during a random write, the main processor 18 may simply create the XOR write command 100 and transfer the created XOR write command 100 to the flash memory controller 42 by way of the disk drive control unit 24.

The microprocessor 48 of the flash memory controller 42 then parses the XOR write command 100, reads out the old parity 96 from the page 72 of the user area 74 of the flash memory 44, creates a new parity 98 by carrying out an exclusive OR operation using the read-out old parity 96, the "b" data 78, which is the old data that has been added to the XOR write command 100, and the "d" data 78, which is the new data that has been added to the XOR write command 100, and stores the created new parity 98 in the specified page 72 of the renewal area 76 in accordance with the physical address that has been added to the XOR write command 100.

Figure 12:
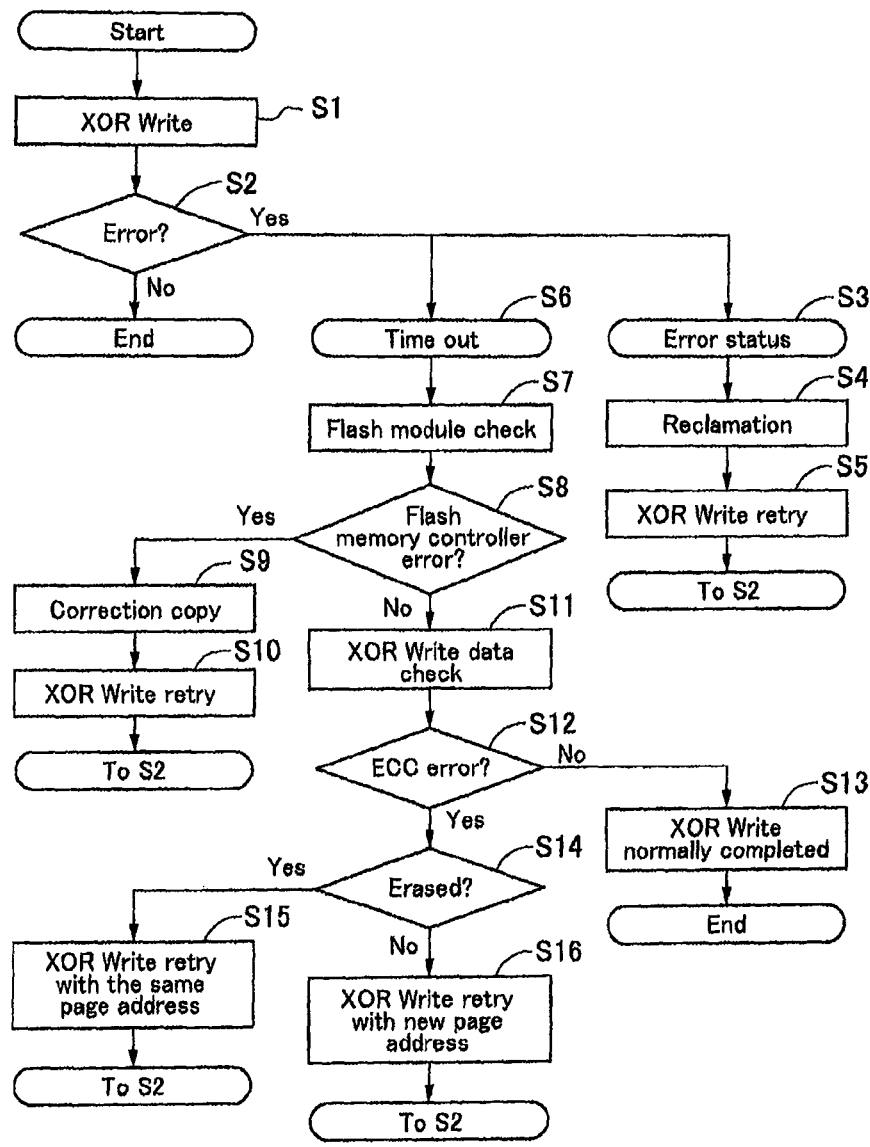
FIG. 12 is a flowchart explaining the working of the first embodiment of the present invention.

Next, the processing of the main processor 18 during a random write will be explained in accordance with the flowchart of FIG. 12. First, as the XOR write process for the flash module 40, the main processor 18 creates the XOR write command 100, transfers the created XOR write command 100 to the flash memory controller 42 by way of the disk drive control unit 24 (S1), and determines whether or not an error occurred in the flash module 40 (S2). When an error has not occurred, the main processor 18 ends the processing of this routine on the basis of the determination that the XOR write process has ended normally in the flash module 40, and when an error has occurred, carries out processing corresponding to the nature of the error.

Specifically, when an error status is sent from the flash memory controller 42 within a set time period (S3), the main processor 18 executes a reclamation process on the basis of the determination that the new parity 98 could not be written to the renewal area 76 (S4).

Figure 13:
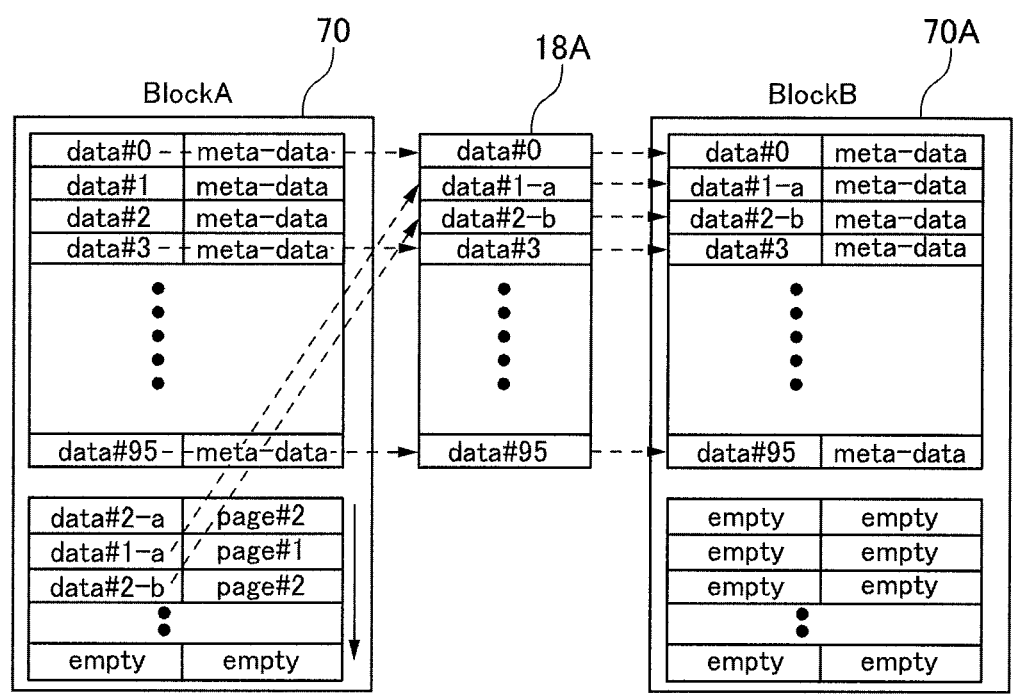
FIG. 13 is a diagram illustrating a reclamation process.

When a reclamation process is carried out, the main processor 18, as shown in FIG. 13, carries out processing to collect the latest data 78 from the block 70, to retrieve the collected latest data 78 to a buffer 18A inside the main processor 18, and to write the latest data 78 retrieved to the buffer 18A to an erased block 70A. Since the logical address and physical address of the latest data 78 change at this time, the main processor 18 carries out processing for updating the conversion table to convert the logical address to the physical address.

Thereafter, as processing for retrying the new parity 98 write to the renewal area 76, the main processor 18 creates a new XOR write command 100, transfers the created XOR write command 100 to the flash memory controller 42, and retries XOR write processing for the flash memory controller 42 (S5). Thereafter, the main processor 18 returns once again to the processing of Step S2, and determines whether or not an error has occurred in the flash module 40.

When it is determined in Step S2 that an error has occurred and the error status has not been returned after the passage of a fixed time period, the main processor 18 executes a time out process (S6) on the basis of the determination that processing has been cancelled, and carries out a process for checking the flash module 40 (S7).

When checking the flash module 40, the main processor 18 determines whether or not the error occurred in the flash memory controller 42 (S8), and when the determination is that the error did occur in the flash memory controller 42, executes a correction copy (S9).

That is, when an error has occurred in the flash memory controller 42 and the error status has not been returned after the passage of a fixed time period, the main processor 18 determines that the parity-storage flash memory 44 itself has malfunctioned, and carries out processing for creating a parity 92 from three pieces of data, for example, the "a", "b" and "c" data 78, and copying the created parity 92 to the parity-storage flash memory 44.

Thereafter, the main processor 18 retries the processing for the same XOR write as that in Step S1 (S10), and returns to the processing of Step S2.

When the determination in Step S8 is that there is no error in the flash memory controller 42, that is, when processing is normal, the main processor 18 carries out processing for checking the new parity 98 written to the renewal area 76 in the parity-storage flash memory 44 (S11), and makes a determination as to whether or not there is an error in the ECC that has been added to the new parity 98 (S12). When the determination at this time is that there is no error in the ECC, that is, when processing is normal, the main processor 18 decides that XOR write processing has ended normally simply by virtue of the fact that a status has not been returned from the flash memory controller 42, carries out processing performed when the XOR write process has ended normally (S13), and ends the processing of this routine.

Conversely, when it has been determined in Step S12 that an error has occurred in the ECC, the main processor 18 determines whether or not the renewal area 76 in the parity-storage flash memory 44 was erased on the basis of the determination that the error occurred in the ECC (S14). When the determination here is that the parity-storage flash memory 44 was erased, the main processor 18 decides that the XOR write itself was not possible, executes processing for retrying the XOR write to the same page 72 of the renewal area 76 in the parity-storage flash memory 44 (S15), and returns once again to Step S2.

When the determination in Step S14 is that the parity-storage flash memory 44 has not been erased, the main processor 18 carries out, on the basis of the decision that the parity write ended part way through the process, processing for retrying the XOR write to a new page of the renewal area 76 in the parity-storage flash memory 44 (S16), and returns to the processing of Step S2.

When the status showing the completion of the XOR write is not returned from the flash memory controller 42 like this, the main processor 18 checks the flash module 40 targeted for the XOR write, and when a malfunction has occurred in the flash module 40 and it is not possible to access the flash module 40 normally even when the power is ON, recovers parity by carrying out a correction copy to the spare flash module 40.

In a case where processing has ended part way through due to the fact that the power to the flash module 40 was cut off, the main processor 18 calls up the new parity 98, checks the data and ECC, and makes a determination as to whether the new parity 98 has yet to be written, an error has occurred part way through the new parity 98 write, or writing of the new parity 98 has been completed.

Then, the main processor 18 carries out a retry (performs XOR write processing once again) to the same page when the new parity 98 has yet to be written, carries out a retry to a new renewal area 76 when the new parity 98 write was in progress, and determines that the power was shut off immediately prior to the completion status having been sent to the main processor 18 and regards the XOR write as having been completed normally when the new parity 98 write has been completed.

In this embodiment, when writing update data to the flash module 40 during a random write, the main processor 18 creates the XOR write command 100, transfers the created XOR write command 100 to the flash memory controller 42 by way of the disk drive control unit 24, and the microprocessor 48 of the flash memory controller 42 parses the XOR write command 100, reads out the old parity 96 from the page 72 of the user area 74 in the flash module 44, creates a new parity 98 by carrying out an exclusive OR using the read-out old parity 96, the "b" data 78, which is the old data that has been added to the XOR write command 100, and the "d" data 78, which is the new data that has been added to the XOR write command 100, and stores the created new parity 98 in the specified page 72 of the renewal area 76.

According to this embodiment, when writing update data to the flash module 40 during a random write, the main processor 18 simply creates the XOR write command 100 and transfers the created XOR write command 100 to the flash memory controller 42 by way of the disk drive control unit 24, making it possible to lessen the processing (load) of the main processor 18.

Embodiment 2

Figure 14:
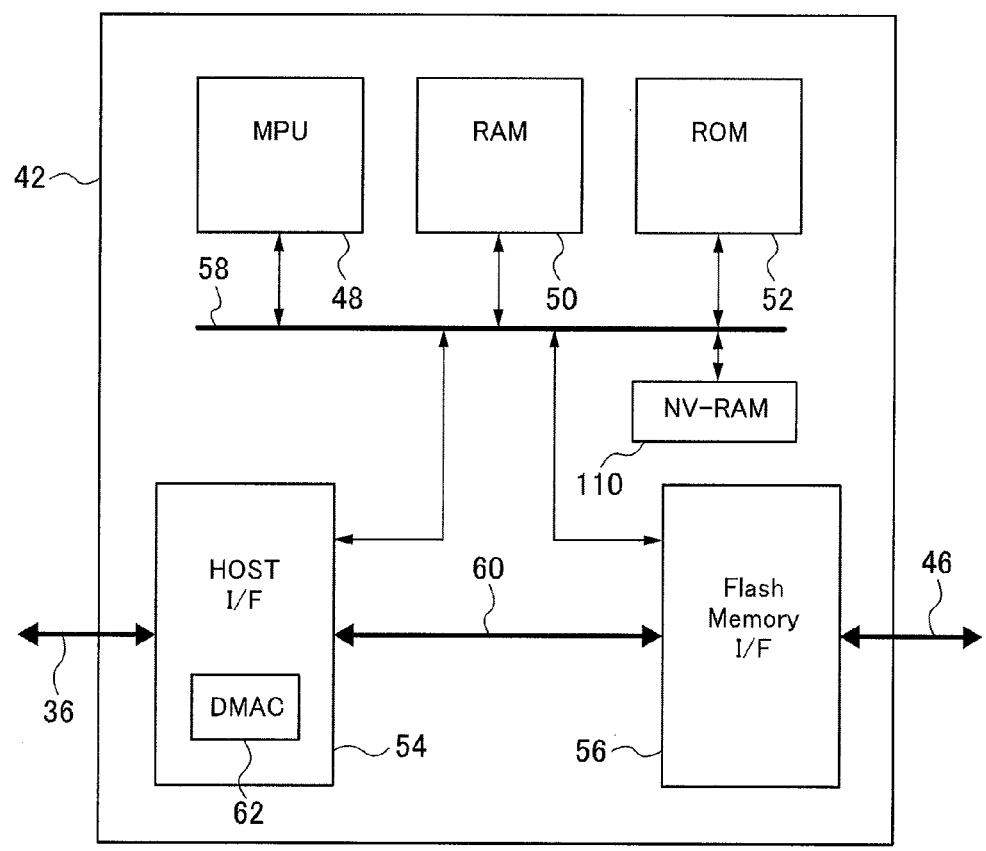
FIG. 14 is a block diagram of a flash memory controller used in a second embodiment of the present invention.
Figure 15:
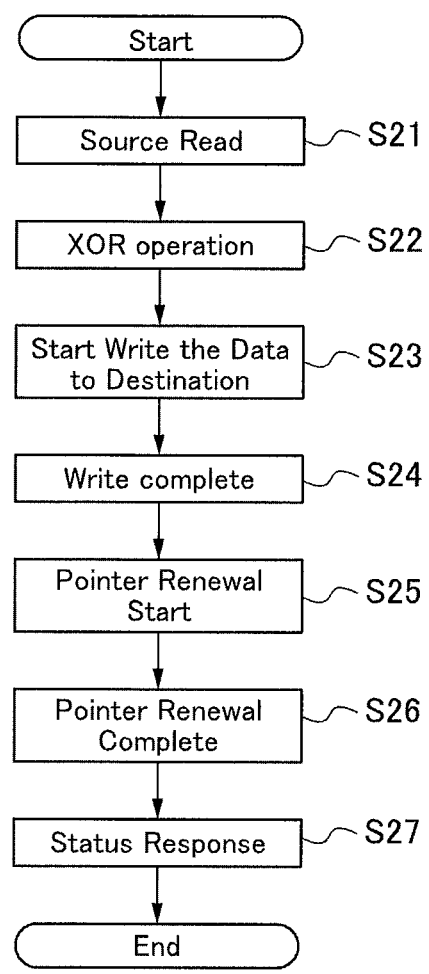
FIG. 15 is a flowchart explaining the working of the second embodiment of the present invention.

Next, a second embodiment of the present invention will be explained in accordance with FIG. 14. This embodiment is configured such that a NV-RAM (Non Volatile Random Access Memory) 110 is disposed as a status recording memory in the flash memory controller 42 and a conversion table for converting a logical address to a physical address is stored in the RAM 50, the contents of the conversion table are updated in a process in which the microprocessor 48 carries out input/output processing to/from the respective flash modules 40 and the processing status is also sequentially recorded in the NV-RAM 110, and the recorded content is transferred to the main processor 18 by way of the host interface 54 making it possible for processing to commence from the place instructed in instruction information from the main processor 18 even when a malfunction occurs part way through the processing. The remainder of the configuration is the same as that of the first embodiment.

Next, the processing of the microprocessor 48 will be explained in accordance with the flowchart of FIG. 14. First, the microprocessor 48 of the flash memory controller 42 carries out processing for reading out the old parity 96 (S21) and commences processing for creating the new parity 98 (S22) prior to starting the XOR write process. Thereafter, the microprocessor 48 carries out processing for creating the new parity 98 from two data, for example, the "b" and "d" data 78, and the old parity 96 and storing the created new parity 98 in the page 72 of the renewal area 76 in the parity-storage flash memory 44, and records the results of this processing in the NV-RAM 110 (S23).

Next, when the new parity 98 has been written to the specified page 72 of the renewal area 76 in the parity-storage flash memory 44, the microprocessor 48 records in the NV-RAM 110 that the new parity 98 write is complete (S24), starts a process for updating the mapping of the conversion table stored in the RAM 50 (S25), and carries out processing for moving a pointer in the conversion table.

Thereafter, when the movement of the pointer in the conversion table has been completed, the microprocessor 48 records this in the NV-RAM 110 (S26), carries out processing for responding to the main processor 18 to the effect that the status is XOR write process complete (S27), and ends the processing of this routine.

As described above, the microprocessor 48 records in the NV-RAM 110 at least four status reports related to the XOR write process denoting new parity 98 write start, new parity 98 write complete, pointer renewal, and XOR write process complete, and transfers the recorded content to the main processor 18, making it possible for the main processor 18 to determine the state to which processing has transitioned in the flash module 40 that is the target of the XOR write process.

In accordance with this, the main processor 18 is able to prepare instruction information corresponding to the microprocessor 48 processing content based on the report transferred from the microprocessor 48, and to send the prepared instruction information to the microprocessor 48. Consequently, the microprocessor 48 is able to continue processing in accordance with the instruction information from the main processor 18 even in a case where the processing was cancelled part way through.

For example, when processing is cancelled prior to the start of a new parity 98 write, the main processor 18 creates the instruction information for retrying the XOR write for the same page 72 of the renewal area 76 in the parity-storage flash memory 44, and transfers this instruction information to the microprocessor 48. Consequently, the microprocessor 48 is able to carry out the XOR write retry for the same page 72 of the renewal area 76 in the parity-storage flash memory 44 in accordance with the instruction information from the main processor 18.

When processing is canceled prior to completion of the new parity 98 write, the main processor 18 creates the instruction information for carrying out an XOR write retry for a new page 72 of the renewal area 76 in the parity-storage flash memory 44, and transfers this instruction information to the microprocessor 48. Consequently, the microprocessor 48 is able to carry out the XOR write retry for a new page 72 of the renewal area 76 in the parity-storage flash memory 44 in accordance with the instruction information from the main processor 18.

When processing is canceled prior to pointer renewal, the main processor 18 creates instruction information for renewing the pointer, and transfers this instruction information to the microprocessor 48. Consequently, the microprocessor 48 carries out pointer renewal processing in accordance with the instruction information from the main processor 18.

When processing is canceled prior to the status report, the main processor 18 creates instruction information to the effect that the XOR write process was completed normally, and transfers this instruction information to the microprocessor 48. Consequently, the microprocessor 48 determines that the XOR write process was completed normally.

In this embodiment, the microprocessor 48 is able to write a new parity 98 to a page 72 of the renewal area 76 in the parity-storage flash memory 44 on the bases of an XOR write command 100 from the main processor 18, and by sequentially recording the processing status in the NV-RAM 110 and transferring the recorded content to the main processor 18 during the steps for carrying out input/output processing to/from the respective flash modules 40, the microprocessor 48 is able to retry processing on the basis of instruction information from the main processor 18.

According to this embodiment, it is possible to lessen the processing (load) of the main processor 18, and to retry processing on the basis of instruction information from the main processor 18.

The invention claimed is:

1. A storage subsystem, comprising:
   a first interface unit for sending and receiving information to and from a host computer via a network;
   a storage apparatus for storing data;
   a second interface unit, which is connected to the storage apparatus, and which carries out data input/output processing to/from the storage apparatus;
   a control unit for controlling via the second interface unit the input/output processing to/from a plurality of logical devices allocated to storage areas of the storage apparatus; and
   a cache memory for temporarily storing data in accordance with the processing of the control unit as a control target for the control unit,
   wherein
   the storage apparatus comprises a plurality of nonvolatile semiconductor memories each including a memory controller for controlling the input/output processing to/from the nonvolatile semiconductor memories, respectively, the nonvolatile semiconductor memories providing one or more RAID groups,
   the control unit, when updating data stored in one of the nonvolatile semiconductor memories, reads the data to be updated, creates an XOR write command including updated data and the data to be updated, and sends the XOR write command to the memory controller of one of the nonvolatile semiconductor memories where parity data corresponding to the data to be updated is stored by way of the second interface unit, and
   the memory controller, upon receiving the XOR write command, reads out from the one of the nonvolatile semiconductor memories the parity data corresponding to the data to be updated, creates a new parity by carrying out an XOR operation based on the read parity data corresponding to the data to be updated, the updated data and the data to be updated included in the XOR write command, and writes the created new parity to the one of the nonvolatile semiconductor memories.

2. The storage subsystem according to claim 1, wherein the control unit adds to the XOR write command a physical address of the old parity and a physical address of the new parity, as well as the old data and the new data, which are targeted for data updating,
   the memory controller reads out the old parity from the one of the nonvolatile semiconductor memories in accordance with the old parity physical address added to the XOR wrote command, creates a new parity by carrying out an exclusive OR operation using the read-out old parity, and the old data and the new data added to the XOR write command, and stores the created new parity in a page belonging to a renewal area of the one of the nonvolatile semiconductor memories in accordance with the physical address of the new parity added to the XOR write command.

3. The storage subsystem according to claim 1, wherein
   the memory controller transfers to the control unit in response to the XOR write command a status denoting the outcome of processing specified by the XOR write command, and
   the control unit, upon receiving a completion status as the status from the memory controller, completes the processing in accordance with the creation of the XOR write command, and upon receiving an error status as the status from the memory controller, creates a new XOR write command for writing a new parity to a new renewal area of the one of the nonvolatile semiconductor memories, transfers the newly created XOR write command to the memory controller, and instructs the memory controller to carry out processing in accordance with the newly created XOR write command.

4. The storage subsystem according to claim 1, wherein
   the memory controller transfers to the control unit in response to the XOR write command a status denoting the outcome of processing specified by the XOR write command, and
   the control unit determines whether or not the memory controller has a malfunction when the status has not been returned from the memory controller within a fixed time period, and
   when the memory controller has a malfunction, creates a parity from a plurality of data, executes a correction copy for copying the created parity to a spare nonvolatile semiconductor memory, creates a new XOR write command for writing the new parity to a new renewal area of the spare nonvolatile semiconductor memory, transfers the newly created XOR write command to the memory controller, and instructs the memory controller to carry out processing in accordance with the newly created XOR write command, and
   when the memory controller is normal, and on a condition that new parity addition information written to the one of the nonvolatile semiconductor memories is normal, completes the processing in accordance with the creation of the XOR write command, based on determination that the new parity has been written normally to the one of the nonvolatile semiconductor memories.

5. The storage subsystem according to claim 1, wherein
   the memory controller transfers to the control unit in response to the XOR write command a status denoting the outcome of processing specified by the XOR write command, and the control unit determines whether or not the memory controller has a malfunction when the status has not been returned from the memory controller within a fixed time period, when the memory controller has a malfunction, creates a parity from a plurality of data, executes a correction copy for copying the created parity to a spare nonvolatile semiconductor memory, creates a new XOR write command for writing the new parity to a new renewal area of the spare nonvolatile semiconductor memory, transfers the newly created XOR write command to the memory controller, and instructs the memory controller to carry out processing in accordance with the newly created XOR write command, when the memory controller is normal, determines whether or not new parity addition information written to the one of the nonvolatile semiconductor memories is normal, when the new parity addition information is written normally, completes the processing in accordance with the creation of the XOR write command, based on determination that the new parity has been written normally to the one of the nonvolatile semiconductor memories, and one of the nonvolatile semiconductor memories, has been erased, when the renewal area to be stored with the new parity has been erased, creates a new XOR write command for writing the new parity to the renewal area to be stored with the new parity, transfers the newly created XOR write command to the memory controller, and instructs the memory controller to carry out processing in accordance with the newly created XOR write command, and when the renewal area to be stored with the new parity has not been erased, creates a new XOR write command for writing the new parity to a renewal area that is different from the renewal area to be stored with the new parity, transfers the newly created XOR write command to the memory controller, and instructs the memory controller to carry out processing in accordance with the newly created XOR write command.

6. The storage subsystem according to claim 1, wherein
the memory controller comprises a status recording memory for sequentially recording a status in which data input/output processing to/from the nonvolatile semiconductor memory is carried out,
the memory controller transfers contents recorded in the status recording memory to the control unit, and
the control unit, upon receiving contents recorded in the status recording memory from the memory controller, creates instruction information based on the received contents, transfers the created instruction information to the memory controller, and instructs the memory controller to carry out processing in accordance with the instruction information.

7. The storage subsystem according to claim 1, wherein
the memory controller comprises a status recording memory for sequentially recording a status in which data input/output processing to/from the nonvolatile semiconductor memory is carried out,
the memory controller transfers contents recorded in the status recording memory to the control unit, and
the control unit, upon receiving from the memory controller, as the contents recorded in the status recording memory, information denoting that processing has been canceled prior to the start of writing of the new parity write, creates on the basis of the received contents a new XOR write command for writing a new parity to the same renewal area of the one of the nonvolatile semiconductor memories, creates instruction information including the newly created XOR write command, transfers the created instruction information to the memory controller, and instructs the memory controller to carry out processing in accordance with the instruction information.

8. The storage subsystem according to claim 1, wherein
the memory controller comprises a status recording memory for sequentially recording a status in which data input/output processing to/from the nonvolatile semiconductor memory is carried out,
the memory controller transfers contents recorded in the status recording memory to the control unit, and
the control unit, upon receiving from the memory controller, as the contents recorded in the status recording memory, information denoting that processing has been canceled prior to the completion of writing of the new parity, creates on the basis of the received contents a new XOR write command for writing a new parity to a new renewal area of the one of the nonvolatile semiconductor memories, creates instruction information including the newly created XOR write command, transfers the created instruction information to the memory controller, and instructs the memory controller to carry out processing in accordance with the instruction information.

9. The storage subsystem according to claim 1, wherein
the memory controller comprises a status recording memory for sequentially recording a status in which data input/output processing to/from the nonvolatile semiconductor memory is carried out,
the memory controller transfers contents recorded in the status recording memory to the control unit, and
the control unit, upon receiving from the memory controller, as the contents recorded in the status recording memory, information denoting that processing has been canceled prior to pointer renewal, creates, on the basis of the received contents, instruction information for carrying out the pointer renewal, transfers the created instruction information to the memory controller, and instructs the memory controller to carry out processing in accordance with the instruction information.

10. The storage subsystem according to claim 1, wherein
the memory controller comprises a status recording memory for sequentially recording a status in which data input/output processing to/from the nonvolatile semiconductor memory is carried out,
the memory controller transfers contents recorded in the status recording memory to the control unit, and
the control unit, upon receiving from the memory controller, as the contents recorded in the status recording memory, information denoting that processing has been canceled prior to a status report, creates, on the basis of the received contents, instruction information to the effect that the processing for writing the new parity has completed normally, transfers the created instruction information to the memory controller, and instructs the memory controller to carry out processing in accordance with the instruction information.

* * * * *